(12) United States Patent
Warlick (10) Patent No.: US 10,033,192 B2
(45) Date of Patent: Jul. 24, 2018

(54) GENSET WITH INTEGRATED RESISTIVE LOADBANK SYSTEM TO PROVIDE SHORT PULSE DURATION POWER

(75) Inventor: Timothy Warlick, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 896 days.

(21) Appl. No.: 14/342,520

(22) PCT Filed: Aug. 31, 2012

(86) PCT No.: PCT/US2012/053478
§ 371 (c)(1),
(2), (4) Date: Jun. 30, 2014

(87) PCT Pub. No.: WO2013/066486
PCT Pub. Date: May 10, 2013

(65) Prior Publication Data
US 2014/0312711 A1    Oct. 23, 2014

Related U.S. Application Data (60) Provisional application No. 61/555,132, filed on Nov. 3, 2011.

(51) Int. Cl.
*H01H 33/59* (2006.01)
*H01H 47/00* (2006.01)
(Continued)

(52) U.S. Cl.
CPC .............. *H02J 4/00* (2013.01); *F02D 29/06* (2013.01); *F02B 63/04* (2013.01); *H02J 3/48* (2013.01); *Y10T 307/76* (2015.04)

(58) Field of Classification Search
CPC ............ Y10T 307/445; Y10T 307/453; Y10T 307/469; Y10T 307/50; Y10T 307/696;
(Continued)

(56) References Cited

U.S. PATENT DOCUMENTS 3,327,274 A    6/1967  Nelson et al.
4,625,123 A *  11/1986 Gillett ..................... H02P 9/105
                                                                290/40 B
(Continued)

OTHER PUBLICATIONS

Extended European Search Report, dated Jul. 31, 2015, in connection with European Patent Application No. 12845012.9, 7 pages.
(Continued)

*Primary Examiner* — Jared Fureman
*Assistant Examiner* — Esayas Yeshaw (57) ABSTRACT

An integrated resistive load bank management system (500) uses a load bank (510) to control a flow of electrical energy to an electrically operated system (520). The load bank management system uses a resistive load bank to dissipate power from a generator set (505). The load bank management system can rapidly switch an electrical connection between a load bank and the generator set and the electrically operated system and the generator set. The load bank management system can provide an instantaneous increase in power to the electrically operated system and provide a short recovery time between power pulses provided to the electrically operated system.

23 Claims, 5 Drawing Sheets

(51) Int. Cl.
  *H01H 85/46* (2006.01)
  *H02J 4/00* (2006.01)
  *F02D 29/06* (2006.01)
  *F02B 63/04* (2006.01)
  *H02J 3/48* (2006.01)

(58) Field of Classification Search
  CPC .............. Y10T 307/74; Y10T 307/766; Y10T 307/826; Y10T 307/76; F02B 63/04; H02J 3/48; H02J 4/00; F02D 29/06
  USPC ....................................................... 307/115
  See application file for complete search history.

(56) References Cited

U.S. PATENT DOCUMENTS

| | | | |
|---|---|---|---|
| 5,416,416 A | 5/1995 | Bisher | |
| 5,949,247 A * | 9/1999 | Lima | G01R 31/343 322/99 |
| 6,441,350 B1 * | 8/2002 | Stoddard | C23C 16/52 219/486 |
| 7,928,596 B2 | 4/2011 | Kumar et al. | |
| 2003/0224833 A1 * | 12/2003 | Egan | H02P 9/30 455/572 |
| 2004/0112045 A1 | 6/2004 | Gomulka | |
| 2005/0034449 A1 | 2/2005 | Frieden et al. | |
| 2005/0134248 A1 * | 6/2005 | Locker | H02M 5/293 323/285 |
| 2005/0159920 A1 * | 7/2005 | Peljto | G06Q 10/04 702/179 |
| 2006/0006652 A1 * | 1/2006 | Witten | F02B 63/04 290/1 A |
| 2008/0259654 A1 * | 10/2008 | Huynh | H02M 3/33523 363/21.16 |
| 2008/0284531 A1 * | 11/2008 | Hornbuckle | H03L 7/1976 331/1 A |
| 2014/0162836 A1 * | 6/2014 | Hug | B60W 10/06 477/3 |
| 2015/0310366 A1 * | 10/2015 | Yu | G06Q 50/06 705/7.22 |

OTHER PUBLICATIONS

Notification of Transmittal of the International Search Report and The Written Opinion of the International Searching Authority, or the Declaration dated Nov. 20, 2012 in connection with International Patent Application No. PCT/US2012/053478.

"Load Banks for Prevention of Wet-Stacking in Diesel Generator Sets", Avtron Loadbank, Jul. 29, 2008, 4 pages.

"Automatic Load Bank Controls", Avtron Loadbank, Jul. 29, 2008, 4 pages.

* cited by examiner

GENSET WITH INTEGRATED RESISTIVE LOADBANK SYSTEM TO PROVIDE SHORT PULSE DURATION POWER

CROSS-REFERENCE TO RELATED APPLICATION(S)

The present application claims priority under 35 U.S.C. § 365 to International Patent Application No. PCT/US2012/053478 filed Aug. 31, 2012. International Patent Application No. PCT/US2012/053478 claims priority under 35 U.S.C. § 365 and/or 35 U.S.C. § 119(a) to United States Provisional Patent Application No. 61/555,132 filed Nov. 3, 2011 which are incorporated herein by reference into the present disclosure as if fully set forth herein.

TECHNICAL FIELD

The present disclosure is directed in general to power generation and more specifically to a generator set with integrated load bank management system to provide fast response, short pulse duration power.

BACKGROUND OF THE DISCLOSURE

A variety of power generator systems are known. A difficulty with such power generator systems may arise when the required duty cycle involves supplying instantaneous power while cycling on and off with very short pulse durations. UPS (uninterruptable power supply) systems require a genset and an energy storage device such as a battery, capacitor, or flywheel to provide instantaneous power response to ensure that a building computer or telephone system are not impacted by a power outage. These UPS systems add complexity and increase cost, weight, and maintenance requirements to the genset.

SUMMARY OF THE DISCLOSURE

According to an embodiment of the disclosure, a system and method for providing power instantaneously of varying amounts and for varying durations is described below.

The power systems consist of a genset, a radiator mounted resistive load bank and a control system.

The resistive load bank is sized to operate at 100% genset power without causing the genset engine to overheat. The load bank may be integrated with the genset or be separate from the genset.

The control system is designed to allow automatic switching of the load bank on and off depending on the external power required of the power system. The amount of power dissipated by the load bank can also be varied by the control system.

A technical advantage is that this power system can provide instantaneous power of very short duration as little as 0.1 seconds or very long duration as over 5 minutes or longer. Power can also be provided continuously at the 100% power level. Still other technical advantage may include the ability to provide a short recovery time between power pulses provided to the electric system.

A cost advantage of this system is due to the lack of complexity, lower maintenance, and possibly lower weight versus alternative energy storage devices such as gensets which include batteries, capacitors or flywheels. Although specific advantages have been enumerated above, various embodiments may include some, none, or all of the enumerated advantages. Additionally, other technical advantages may become readily apparent to one of ordinary skill in the art after review of the following figures and description.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

It should be understood at the outset that, although example embodiments are illustrated below, the present invention may be implemented using any number of techniques, whether currently known or not. The present invention should in no way be limited to the example implementations, drawings, and techniques illustrated below. Additionally, the drawings are not necessarily drawn to scale.

In mobile or stationary electronic equipment, a power source may be required to supply power as rapidly as possible. To provide a near instantaneous power source increase, a generator set (GENSET or genset) power source may be used. However, problems may be encountered in settings where power demands require very fast response times and very short recovery times.

Given such concerns, certain embodiments of the disclosure describe a system and method to provide an instantaneous power source response time that supplies power to electronic equipment by substantially simultaneously switching power from a load bank to providing pulse power. When the power is not needed, the power is switched back to the load bank. This switch can be instantaneous, such as within five (5) milliseconds, or be with a desired time second delay. Additionally, in this embodiment, the genset is operating at constant power, and is not impacted by the switch between load bank and external pulse power. Therefore, there is no delay or recovery times in the genset response. Certain embodiments of the disclosure also provide for very short or very long power pulse durations to the external source. Switching from the load bank to the electronic equipment can be automatic or manual control. Embodiments of the present disclosure provide a less complex, lighter weight, small package, lower maintenance and lower cost method than using batteries, flywheels, or oversized genset.

Figure 1:
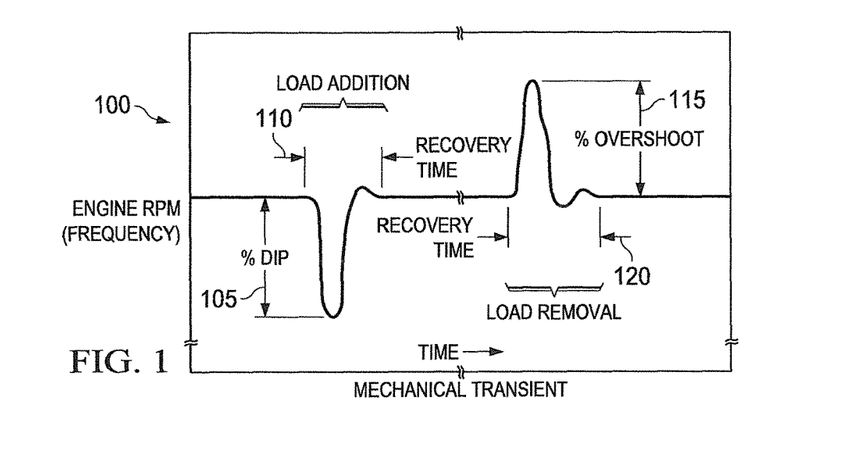
FIG. 1 illustrates a typical genset response diagram which shows frequency dip and recovery time once load is applied or removed.
Figure 2A:
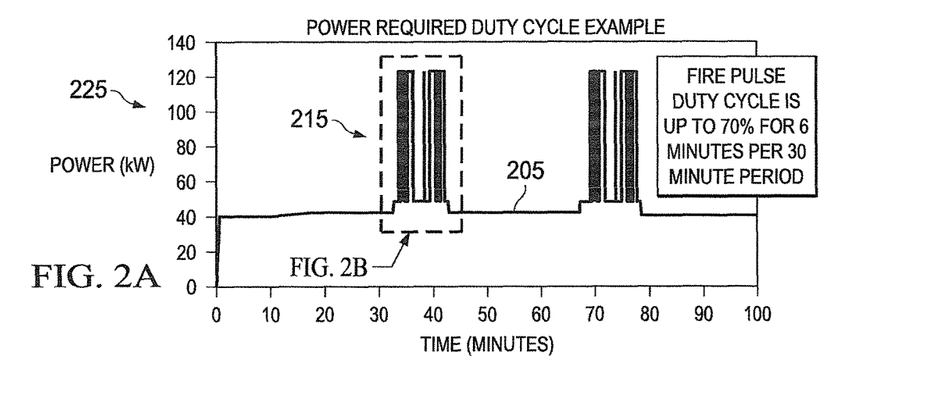
FIG. 2 illustrates example pulse duration duty cycle diagrams according to the disclosure.
Figure 2B:
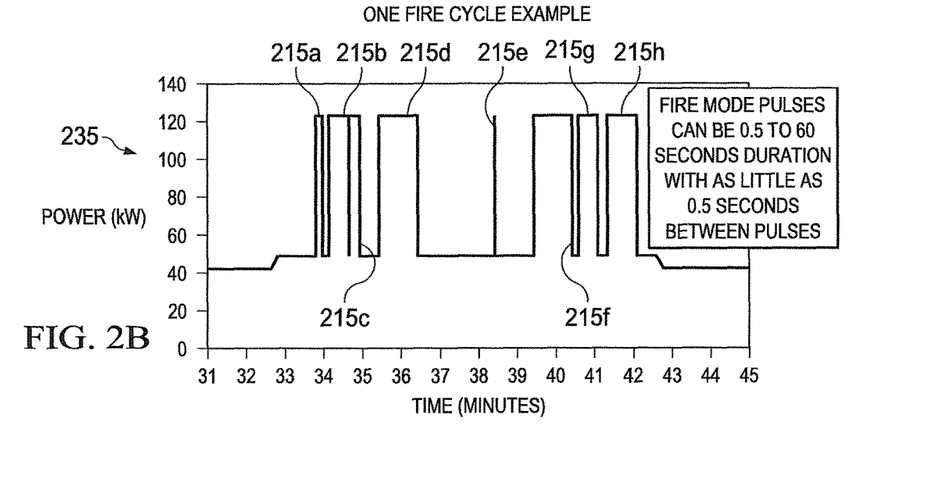
Figure 2C:
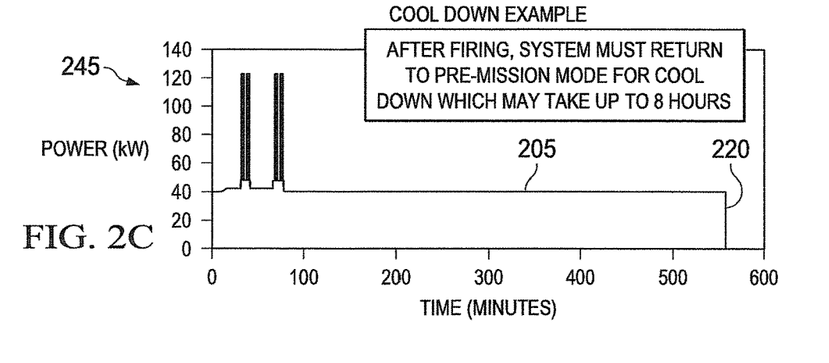
Figure 2D:
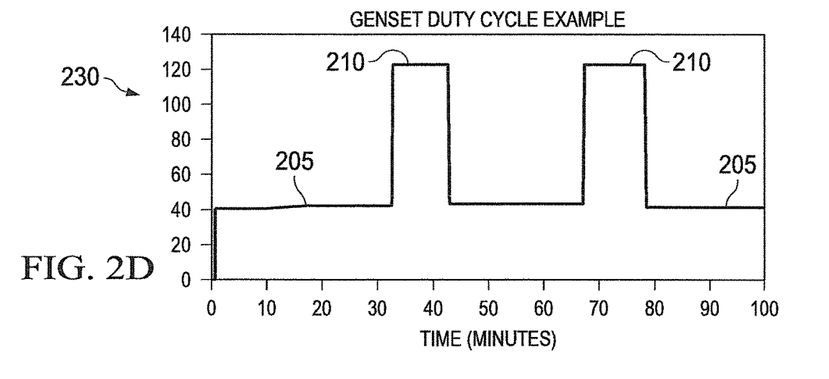
Figure 2E:
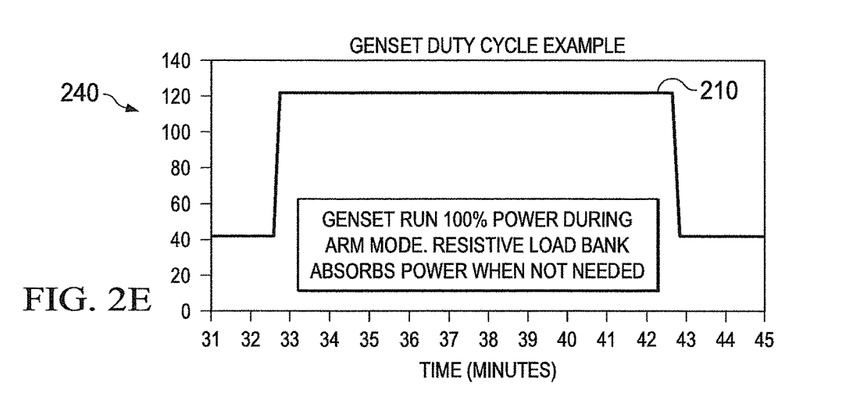

FIG. 1 illustrates a typical genset response diagram 100 of a system according to Commercial and International Standard ISO 8528 which determine the % dip and frequency recovery time limits for specific genset performance class rating designations. For example, a G3 performance class would limit % dip 105 to less than 7% and recovery time 110 to less than 3 seconds for a turbocharged diesel engine genset when 100% of the rated load is applied to the genset. Similar requirements are specified when the load is removed from the genset (i.e, for a % overshoot 115 and a recovery time 120).

In certain examples, the power pulse durations can be 0.5 to 60 seconds. The duty cycle can have a variable number of pulses over a six-minute period every thirty-minute timeframe. However, the genset inertia and load acceptance recovery time delays, such as three-seconds, prevent the genset from cycling on and off at very short pulse durations.

FIG. 2 illustrates an example pulse diagrams according to the disclosure. Although certain details will provided with reference to the parameters of the pulses, it should be understood that other embodiments may include more, less or different parameters.

The electric system can require a steady, or relatively consistent, power 205 supply to power various components, such as, cooling or vacuum pumps. During an activation of one or more functions of the electric system, the electric system may require an increase in power. For example, the electric system can be a lethal or non-lethal military weapon system that requires an increase in power when a trigger is activated (e.g., pulled). The genset provides the pulse 210 when the electric system requires an increase in power. Thereafter, the genset may provide the steady power 205 until such time that the electric system requires an increase in power. For example, the genset can provide the pulse 210 for a six-minute period over a thirty-minute period, then provide another pulse 210.

The pulse 215 for the electric system includes a number of short power pulses 215a-215h as are shown in the more detailed plot 235. The genset produces the pulse 210 to provide the number of short power pulses 215a-215h. As shown in FIG. 2, the time scales of the plots 225, 230, 235, 240 and 245 correspond. The relationships between the pulses in the plots are evident from the time scales of the plots 225, 230, 235, 240 and 245. For example, the pulse 210 can have a duty cycle of 70% over a six-minute period. In addition, in an activation mode, that is, when the electric system requires an increase in power, the pulses 215a-215h can be 0.5 to sixty-seconds in duration with as little as 0.5 seconds in-between pulses 215a-215h. Thereafter, after the genset returns to the steady power 205 while the electric system is in a post mission mode, such as a cool down cycle that may last several hours, after which, the power drops 220 to zero, as shown in the cool down example in FIG. 2.

Figure 3:
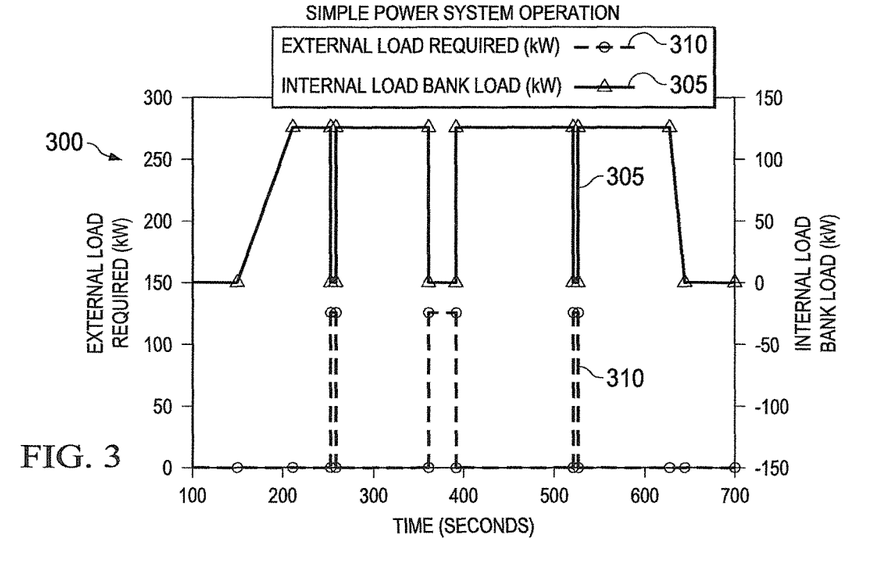
FIG. 3 illustrates switching operation according to embodiments of the present disclosure.

FIG. 3 illustrates an example switching operation according to embodiments of the present disclosure. The power can be switched between the internal load bank 305 and the external power required 310. The switching time can be instantaneous, such as within five (5) milliseconds, or can be set to have a time delay. In the example shown in FIG. 3, the power to the internal load bank 305 increases to a certain power level and remains steady until such time as the switching operation occurs. During the switching the operation power to the internal load bank 305 is dropped as power is delivered to the external load 310.

Figure 4:
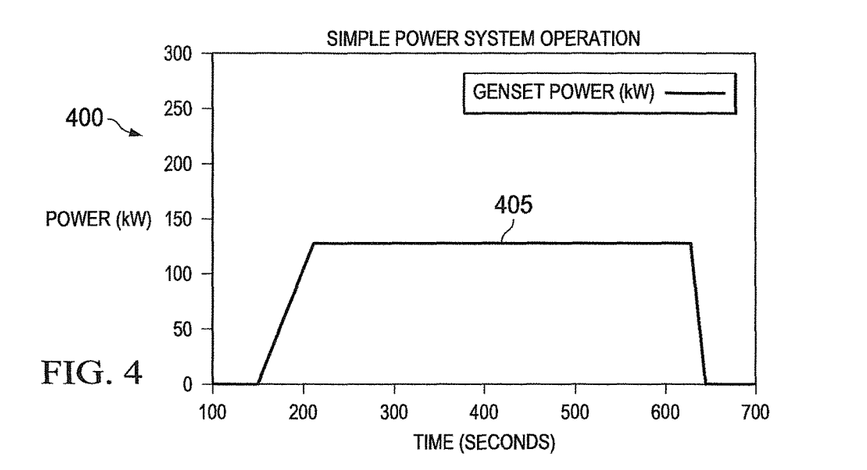
FIG. 4 illustrates power generated from a genset during the switching operation of FIG. 3.

FIG. 4 illustrates power generated from a genset during the switching operation of FIG. 3. The power generated from the genset remains steady while the power used is switched in-between the internal source and the external source.

Figure 5:
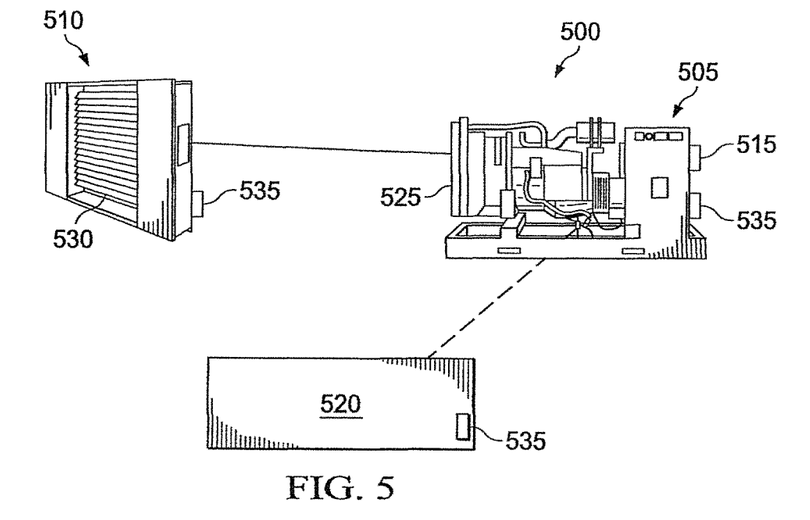
FIG. 5 illustrates an example power system according to embodiments of the present disclosure.

FIG. 5 illustrates an example power system 500 according to embodiments of the present disclosure. The system 500 of FIG. 5 is configured to provide an instantaneous increase in power in response to an activation of the electric system. Although certain details will be provided with reference to the components of the system 500 of FIG. 5, it should be understood that other embodiments may include more, less, or different components. The system 500 of FIG. 5 includes a generator set 505; a load bank 510, and a control system 515. The system 500 is coupled to the electric system 520.

The genset 505 represents any suitable source of power for energizing the electric system 520 and, in this embodiment, is shown as a fuel generator set. Fuel gensets convert chemical energy from a fuel into electrical energy via a mechanical reaction wherein the fuel is burned to drive the mechanical process. The fuel used for the genset 505 can be diesel, natural gas, bio-fuels, gasoline and alternative fuels. Other fuel sources may be used or developed by one of ordinary skill in the art, so further details of fuel is not provided. In particular embodiments, the genset 505 may include a ramp-up time that may not be particularly well-suited to provide instantaneous increase in power when a demand is required by the electric system 520.

The load bank 510 is any suitable device that can take and dissipate energy from a power source, such as genset 505. In the embodiment of FIG. 5, the load bank 510 is shown as a radiator-mounted resistive load. The load bank 510 mounts adjacent to a genset radiator 525. The load bank 510 includes a resistive heating element 530 and a fan (not specifically shown). In certain embodiments, the load bank 510 includes a plurality of independent resistive elements 530 that can be operated respectively to adjust a load step on the power system 500. The load bank 510 is sized to operate at 100% of the genset 505 power without causing the genset 510 to overheat. The load bank 505 is detachably coupled to the genset 505, such as through a switch. When coupled to the genset 505, the load bank'510 receives power from the genset 505. The electrical energy received from the genset 505 circulates through the resistive heat element 530, which increases in temperature as a result. The genset engine fan on the genset push the heat away from the heating elements 530. If an external resistive load bank is used, it may have its own electric fan to push away the heat.

The control system 515 controls various operations in the system 500, such as the operation of the load bank 510 and genset 505 or operation of switches that control the load bank 510 and genset 505. In particular embodiments, the control system 515 includes a processor, microprocessor, microcontroller, field programmable gate array, digital signal processor, or other processing or control device(s). In certain embodiments, the control system 515 also includes a memory, and peripheral modules that allow the control system 515 to communicate with other devices. The control system 515 is capable of processing a variety of logic either stored therein or stored on another device. The dashed lines in FIG. 5 between the control system 515 and various components represent communication—either with appropriate wiring or wirelessly—between the control system 515 and such components. In certain embodiments, the control system 515 can be a single controller capable of controlling both the load bank 510 and genset 505. In certain embodiments, the control system 515 includes a first control system configured to control operation of the load bank 510 and a second control system configured to control operation of the genset 505 and communicate with the first control system. In some embodiments, the control system 515 is disposed within the electric system 520.

In some embodiments, the control system 515 obtains information concerning operation of the power system, such as the operation of the load bank 510 and operation of the genset 505, from sensing circuits 535. Based on the value received from the sensing circuits 535, the control system 515 can perform a variety of actions. For example, the control system 515 may send appropriate signals to open and/or close switches to turn on or turn off portions of the load bank 510. The control system 515 may also send signal(s) to one or both of the load bank 510 and the genset 505. The control system 515 allows automatic switching of the load bank 510 on and off as specified functions of the electric system 520 are activated. That is, the control system enables switching, without additional human action, of the load bank 510 on and off in response to triggering of a function of the electric system 520. For example, the control system 515 can switch the load bank off when a trigger is activated on the electric system 520. Although a control system 515 is shown in this embodiment, other embodiments may use other types of control devices, such as processors, memory, and peripherals not technically forming a single controller.

In certain embodiments, a load step size, that is, the amount of the power increase provided to the electric system 520, can be input into the controller. In certain embodiments, the load step size is determined by the control system 515. For example, the control system 515 can determine the load step automatically based on an actual power used by the electric system 520 such that the genset 505 power is constant. The control system 515 can activate switches to turn on or turn off portions of the load bank 510 to achieve the desired load step. In one example, the control system 515 monitors a downstream load to determine the load step size.

In certain embodiments, the control system 515 is a simple relay switch that is activated by an external manual or electronic trigger. The trigger causes the load to switch between the internal load bank and the external load.

Figure 6:
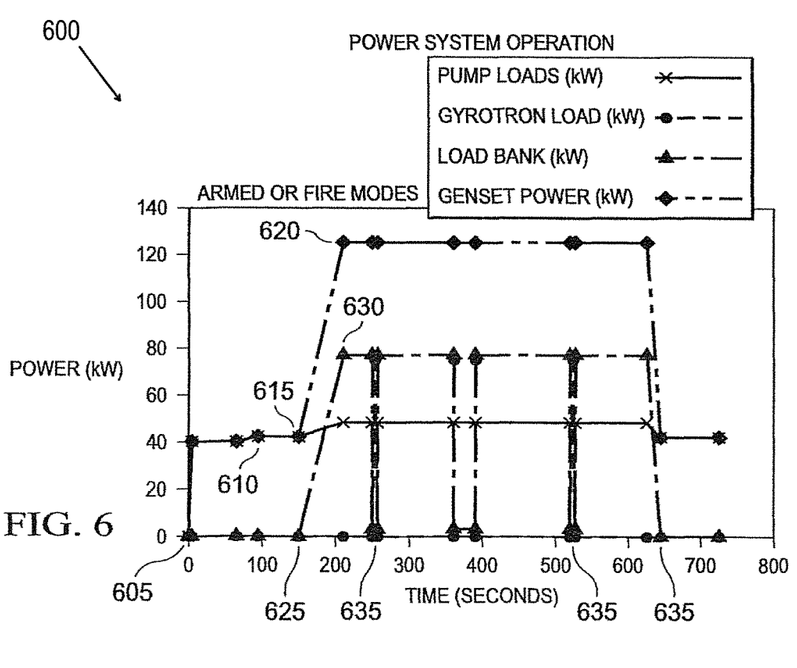
FIG. 6 illustrates an actual power system operation according to embodiments of the present disclosure.

FIG. 6 illustrates an example power system operation 600 according to embodiments of the present disclosure. The scenario shown in FIG. 6 corresponds to a single load step size of 80 kW, although more load steps or different step sizes could be used. This operation 600 may be utilized with components described in FIG. 5 or with other components. At step 605, at startup the genset 505 provides a steady state power to supply the parasitic components of the electric system 520, such as cooling and vacuum pumps. For example, the genset 505 can provide a relatively steady 40 kW to the electric system 520.

At step 610, the electric system enters a "stand-by" mode. For example, the stand-by mode can correspond to a state just prior to arming the electric system to engage one or more functions. In the stand-by mode, power is provided to a filament and a magnet is energized. Therefore, the power system 500 provides a small increase in power, such as 2 kW, to the electric system 520.

At step 615, the electric system is placed in an "armed" mode. For example, the armed mode can correspond to a state in which the electric system is ready to engage one or more specified functions upon activation of a trigger. In the armed mode, full power is provided to the electric system. Therefore, the power system 500 increases power to full, such as 122 kW. The control system 515 operates the genset 505 to increase a power output to full, such as 122 kW at step 620. However, the electric system only requires another incremental increase of power, such as to 48 kW, to power armed mode components, such as setting the cooling pumps to full speed. Therefore, the control system 515 also operates the load bank 510 to turn on and dissipate the excess energy. The load bank 510 increases from a zero state at 625 to full load at 630.

At step 635, a function of the electric system 520 is activated. For example, a trigger on the electric system 520 may be engaged or toggled. The triggering of the electric system 520 could require a single pulse or a number of pulses. The control system 515, in response to the trigger engagement, switches the load bank 510 off. As a result of switching the load bank off, the power delivered to the electric system instantaneously increases from 40 kW to 122 kW. In certain embodiments, when the trigger requires a plurality pulses, the control system 515 can rapidly switch the load bank 510 on and off while maintaining the genset 505 at full power. By repeating the process 600, a continuous rapid switching may occur between the dissipation of power by the load bank 510 and the providing the power to the electric system 520. As such, the control system 515 causes the power system 500 to rapidly provide an instantaneous increase in power to the electric system 520.

In certain embodiments, the genset 505 operates at 10% power continuously but must be ready to increase to 100% power when required by the external load. Such continuous may result in wetstacking of the diesel genset 505. Wet stacking of diesel engine gensets when operated for long periods of time at less than 30% load is a known problem with the root cause and preventive fixes well understood to one of ordinary skill in the art. Genset commercial international standards ISO 8528 cover a lot but do not address wet stacking. National Fire Protection Association (NFPA) standby genset guidelines specify monthly and annual operation at above 30% load to prevent wet stacking. For example, according to:

Monthly Testing (NFPA 110 8.4.2)

A generator must undergo a thirty-minute test each month. To pass the test, the generator must meet one of the following conditions:
    Achieve the minimum exhaust gas temperature according to the manufacturer's recommendations;
    Operate at a minimum of thirty percent of the nameplate kilowatt rating for the duration of the test.

If the generator cannot operate at a minimum of thirty minutes, the test can be stopped once the water temperature and oil pressure stabilize. If the genset fails to pass the monthly test, the genset must be tested annually using a load bank.

Annual Testing (NFPA 110 8.4.3)

A genset that fails the monthly test must be operated for two continuous hours using a load bank. The two-hour test should be conducted as follows:
    30 minutes at 25 percent of the nameplate kilowatt rating
    30 minutes at 50 percent of the nameplate kilowatt rating
    60 minutes at 75 percent of the nameplate kilowatt rating Also known as a "load run," this test can improve the generator's efficiency and eliminate wet stacking—a condition where unburned fuel enters a generator's exhaust side, decreasing its efficiency and causing parts to wear prematurely.

According to embodiments of the present disclosure, with the integration of a load bank into pulse power system 500, the load bank 510 can used for weekly/monthly checks recommended above to prevent wet stacking. The load bank 510 can also be used to check full 100% power at specified interval to ensure the engine is operating correctly.

Figure 7:
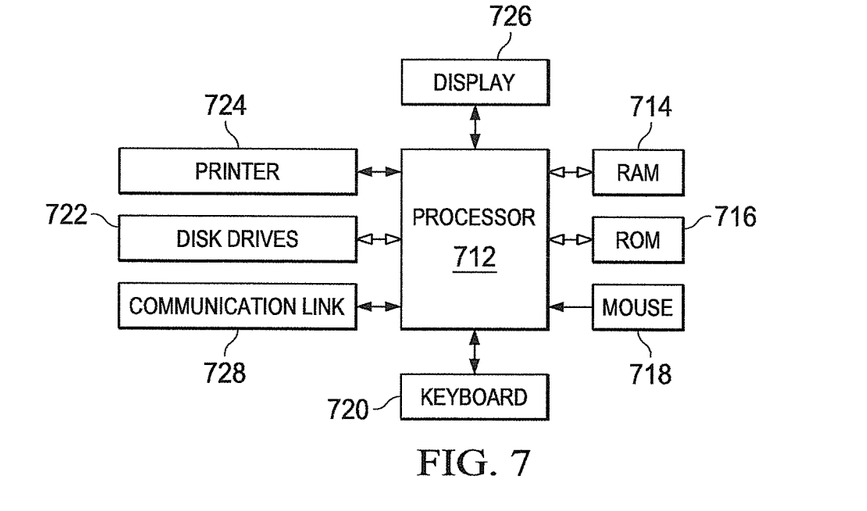
FIG. 7 illustrates a simple relay switch or a general purpose computer which may be used in connection with other embodiments of the disclosure to carry out any of the above-referenced functions.

FIG. 7 illustrates a general purpose computer 710 that may be used in connection with other embodiments of the disclosure to carry out any of the above-referenced functions. General purpose computer 710 may generally be adapted to execute any of the known OS2, UNIX, MAC-OS, LINUX, ANDROID and/or WINDOWS Operating Systems or other operating systems. The general purpose computer 710 in this embodiment includes a processor 712, a random access memory (RAM) 714, a read only memory (ROM) 716, a mouse 718, a keyboard 720 and input/output devices such as a printer 724, disk drives 722, a display 726 and a communications link 728. In other embodiments, the general purpose computer 710 may include more, less, or other component parts. Embodiments of the present disclosure may include programs that may be stored in the RAM 714, the ROM 716 the disk drives 722, or other storage medium and may be executed by the processor 712 in order to carry out functions described herein. The communications link 728 may be connected to a computer network or a variety of other communicative platforms including, but not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. Disk drives 722 may include a variety of types of storage media such as, for example, floppy disk drives, hard disk drives, CD ROM drives, DVD ROM drives, magnetic tape drives or other suitable storage media. Although this embodiment employs a plurality of disk drives 722, a single disk drive 722 may be used without departing from the scope of the disclosure.

Although FIG. 7 provides one embodiment of a computer that may be utilized with other embodiments of the disclosure, such other embodiments may additionally utilize computers other than general purpose computers as well as general purpose computers without conventional operating systems. Additionally, embodiments of the disclosure may also employ multiple general purpose computers 610 or other computers networked together in a computer network. Most commonly, multiple general purpose computers 610 or other computers may be networked through the Internet and/or in a client server network. Embodiments of the disclosure may also be used with a combination of separate computer networks each linked together by a private or a public network.

Several embodiments of the disclosure may include logic contained within a medium. In the embodiment of FIG. 6, the logic includes computer software executable on the general purpose computer 610. The medium may include the RAM 614, the ROM 616, the disk drives 622, or other mediums. In other embodiments, the logic may be contained within hardware configuration or a combination of software and hardware configurations. The logic may also be embedded within any other suitable medium without departing from the scope of the disclosure.

It will be understood that well known processes have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

Modifications, additions, or omissions may be made to the systems, apparatuses, and methods described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order. As used in this document, "each" refers to each member of a set or each member of a subset of a set.

To aid the Patent Office, and any readers of any patent issued on this application in interpreting the claims appended hereto, applicants wish to note that they do not intend any of the appended claims or claim elements to invoke paragraph 6 of 35 U.S.C. Section 112 as it exists on the date of filing hereof unless the words "means for" or "step for" are explicitly used in the particular claim.

What is claimed is:

1. A system comprising:
    an electric powered system;
    a generator set coupled to the electric powered system and configured to generate electrical energy;
    a load bank coupled to the generator set and configured to switchably receive the electrical energy generated by the generator set; and
    a control system coupled to the generator set, wherein the control system is configured to:
        in response to detecting a first triggering of the electric powered system, increase the generation of the electrical energy and transmit at least some of the increased electrical energy generated by the generator set to the load bank, and
        in response to detecting a second triggering of the electric powered system, switch a destination of at least some of the increased electrical energy generated by the generator set to the electric powered system.

2. The system of claim 1, wherein the control system is configured to switch the destination of the at least some of the increased electrical energy by closing or opening an electrical path between the load bank and the generator set.

3. The system of claim 2, wherein the control system is configured to switch the destination of the at least some of the increased electrical energy to the electric powered system by at least one of: a predetermined load step size; a load step size calculated by the control system; instantaneously; at a specified time delay; and at a specific ramp-up rate.

4. The system of claim 3, wherein the control system is configured to monitor the electric powered system to calculate the load step size.

5. The system of claim 1, further comprising at least one sensing circuit configured to provide infomation regarding operation of at least one of the load bank, the generator set, and the electric powered system.

6. The system of claim 1, wherein the control system is configured to control a portion of the load bank and the generator set to incrementally increase a flow of the electrical energy to the electric powered system to at least one of:
    provide steady-state power to supply parasitic components of the electric powered system;
    place the electric powered system in a stand-by state;
    place the electric powered system in an armed state; and
    dissipate excess energy via the load bank.

7. The system of claim 1, wherein the control system is configured to cycle a switching operation of the load bank to prevent wet stacking.

8. The system of claim 1, wherein the control system is configured to cycle a switching operation of the load bank to check full 100% power at a specified interval to ensure that an engine associated with the generator set is operating correctly.

9. An apparatus comprising:
a generator set configured to be coupled to an electric powered system and configured to generate electrical energy;
a load bank coupled to the generator set and configured to switchably receive the electrical energy generated by the generator set; and
a control system coupled to the generator set, wherein the control system is configured to:
in response to detecting a first triggering of the electric powered system, increase the generation of the electrical energy and transmit at least some of the increased electrical energy generated by the generator set to the load bank, and
in response to detecting a second triggering of the electric powered system, switch a destination of at least some of the increased electrical energy generated by the generator set to the electric powered system.

10. The apparatus of claim 9, wherein the control system is configured to switch the destination of the at least some of the increased electrical energy by closing or opening an electrical path between the load bank and the generator set.

11. The apparatus of claim 10, wherein the control system is configured to switch the destination of the at least some of the increased electrical energy to the electric powered system by at least one of: a predetermined load step size; a load step size calculated by the control system; instantaneously; at a specified time delay; and at a specific ramp-up rate.

12. The apparatus of claim 11, wherein the control system is configured to monitor the electric powered system to calculate the load step size.

13. The apparatus of claim 9, further comprising at least one sensing circuit configured to provide information regarding operation of at least one of the load bank, the generator set, and the electric powered system.

14. The apparatus of claim 9, wherein the control system is configured to control a portion of the load bank and the generator set to incrementally increase a flow of the electrical energy to the electric powered system to at least one of:
provide steady-state power to supply parasitic components of the electric powered system;
place the electric powered system in a stand-by state;
place the electric powered system in an armed state; and
dissipate excess energy via the load bank.

15. The apparatus of claim 9, wherein the control system is configured to cycle a switching operation of the load bank to prevent wet stacking.

16. The apparatus of claim 9, wherein the control system is configured to cycle a switching operation of the load bank to check full 100% power at a specified interval to ensure that an engine associated with the generator set is operating correctly.

17. A method comprising:
generating, by a generator set, electrical energy;
in response to detecting a first triggering of an electric powered system, increasing the generating of the electrical energy and transmitting at least some of the increased electrical energy to a load bank; and
in response to detecting a second triggering of the electric powered system, switching a destination of at least some of the increased electrical energy generated by the generator set to the electric powered system,
wherein the load bank is coupled to the generator set and is configured to switchably receive at least some of the electrical energy generated by the generator set.

18. The method of claim 17, wherein switching the destination of the at least some of the increased electrical energy comprises closing or opening an electrical path between the load bank and the generator set.

19. The method of claim 18, wherein switching the destination of the at least some of the increased electrical energy comprises switching the destination of the at least some of the increased electrical energy to the electric powered system by at least one of: a predetermined load step size; a calculated load step size; instantaneously; at a specified time delay; and at a specific ramp-up rate.

20. The method of claim 19, further comprising monitoring the electric powered system to calculate the load step size.

21. The method of claim 17, wherein switching the destination of the at least some of the increased electrical energy comprises controlling a portion of the load bank and the generator set to incrementally increase a flow of the electrical energy to the electric powered system to at least one of:
provide steady-state power to supply parasitic components of the electric powered system;
place the electric powered system in a stand-by state;
place the electric powered system in an armed state; and
dissipate excess energy via the load bank.

22. The method of claim 17, further comprising cycling a switching operation of the load bank to prevent wet stacking.

23. The method of claim 17, further comprising cycling a switching operation of the load bank to check full 100% power at a specified interval to ensure that an engine associated with the generator set is operating correctly.

* * * * *